(12) United States Patent
Ho et al.

(10) Patent No.: US 10,954,137 B2
(45) Date of Patent: Mar. 23, 2021

(54) INTERNET OF THINGS WATER PURIFICATION SYSTEM

(71) Applicant: EONPLUS CO. LTD., Taipei (TW)

(72) Inventors: Chin-Yee Ho, Taipei (TW);
Chung-Cheng Chen, Taipei (TW);
Yi-Chen Yu, Yilan (TW)

(73) Assignee: EONPLUS CO. LTD., Taipei (TW)

( * ) Notice: Subject to any disclaimer, the term of this patent is extended or adjusted under 35 U.S.C. 154(b) by 0 days.

(21) Appl. No.: 16/592,816

(22) Filed: Oct. 4, 2019

(65) Prior Publication Data

US 2020/0109062 A1 Apr. 9, 2020

(30) Foreign Application Priority Data

Oct. 9, 2018 (TW) .................................. 107213646

(51) Int. Cl.
*B01D 29/60* (2006.01)
*B01D 35/143* (2006.01)
(Continued)

(52) U.S. Cl.
CPC .............. *C02F 1/003* (2013.01); *B01D 29/60* (2013.01); *B01D 29/603* (2013.01);
(Continued)

(58) Field of Classification Search
CPC .... C02F 1/003; C02F 1/008; C02F 2209/008; C02F 1/001; C02F 2201/006; C02F 2209/445; C02F 2209/006; C02F 1/004; C02F 1/68; C02F 1/685; C02F 1/686; C02F 1/687; C02F 2209/005; C02F 2209/42; H04L 67/12; H04L 67/10; H04L 67/02; H04L 67/025; H04L 67/04; H04L 67/1097; H04L 67/125; H04W 4/70; H04W 4/021; H04W 4/35; H04W 4/38; H04W 4/80;
(Continued)

(56) References Cited

U.S. PATENT DOCUMENTS

| 5,236,601 A * | 8/1993 | Snell | ...................... B01D 37/04 210/741 |
| 7,497,957 B2 * | 3/2009 | Frank | ...................... C02F 1/008 210/739 |

(Continued)

*Primary Examiner* — Joseph W Drodge

(57) ABSTRACT

An IoT water purification system includes a water purification device and a cloud management device. The water purification device includes a filter element, a water tank, a water quantity sensing circuit, a filter element sensing circuit, and a water purification side wireless transmission circuit. The water quantity sensing circuit measures a current storage quantity of the drinking water to generate respective water quantity information. The filter element sensing circuit measures a water quality of the tap water to generate water quality information. The cloud management device includes a cloud wireless transmission circuit and a cloud processing circuit. The cloud processing circuit determines the storage quantity of the drinking water according to the water quantity information, counts the water quality information to generate historical water quantity information, and counts a current service life of the filter elements according to the current water quality information and the historical water quantity information.

16 Claims, 7 Drawing Sheets

(51) Int. Cl.
*C02F 1/00* (2006.01)
*H04L 29/08* (2006.01)

(52) U.S. Cl.
CPC ............ *B01D 35/143* (2013.01); *C02F 1/008* (2013.01); *H04L 67/12* (2013.01); *C02F 2209/008* (2013.01)

(58) Field of Classification Search
CPC ... H04W 67/10; H04W 67/12; H04W 67/125; H04W 84/00; H04W 88/08; H04W 88/085; H04W 88/10; H04W 88/18; H04W 92/00; H04W 92/16; B01D 29/50; B01D 29/52; B01D 29/56; B01D 29/60; B01D 29/603; B01D 29/605; B01D 35/143; B01D 2201/52; B01D 2201/54; B01D 2201/56
USPC ................ 210/86, 87, 96.1, 96.2, 143, 739; 705/1.1, 7.11, 305, 306, 308
See application file for complete search history.

(56) References Cited

U.S. PATENT DOCUMENTS

| | | | | |
|---|---|---|---|---|
| 7,638,042 B2* | 12/2009 | Astle | .................... | B01D 27/101 |
| | | | | 210/100 |
| 8,702,977 B2* | 4/2014 | Shah | ...................... | G06Q 40/12 |
| | | | | 210/85 |
| 9,850,845 B2* | 12/2017 | Sloan | ............... | B60K 15/03006 |
| 2004/0138840 A1* | 7/2004 | Wolfe | .................... | B01D 61/12 |
| | | | | 702/81 |
| 2006/0011553 A1* | 1/2006 | Nightingale | .............. | C02F 1/74 |
| | | | | 210/722 |
| 2007/0012628 A1* | 1/2007 | Frank | ...................... | C02F 1/008 |
| | | | | 210/668 |
| 2008/0078710 A1* | 4/2008 | Larkner | ................... | C02F 1/008 |
| | | | | 210/109 |
| 2010/0106265 A1* | 4/2010 | Ebrom | .................... | H04L 67/12 |
| | | | | 700/90 |
| 2012/0000858 A1* | 1/2012 | Butler | .................... | C02F 1/008 |
| | | | | 210/741 |
| 2012/0278454 A1* | 11/2012 | Stewart | ................... | H04L 67/34 |
| | | | | 709/220 |
| 2013/0220905 A1* | 8/2013 | Waite | ........................ | C02F 1/32 |
| | | | | 210/177 |
| 2016/0046502 A1* | 2/2016 | Rice | ........................ | C02F 1/003 |
| | | | | 210/85 |
| 2016/0066589 A1* | 3/2016 | Massey | ................... | G01V 8/10 |
| | | | | 99/486 |
| 2016/0323863 A1* | 11/2016 | Park | ........................ | H04W 4/70 |
| 2018/0117508 A1* | 5/2018 | Paluszewski | ........ | B01D 35/143 |
| 2020/0106695 A1* | 4/2020 | Rk | ...................... | H04L 67/1097 |
| 2020/0211364 A1* | 7/2020 | Kasiviswanathan | ........................ | |
| | | | | G08B 17/125 |

\* cited by examiner

INTERNET OF THINGS WATER PURIFICATION SYSTEM

TECHNICAL FIELD

The present invention relates to an Internet of Things (IoT) water purification system, and more particularly to an IoT water purification system that manages the storage quantity of drinking water and the service life of the filter element through a cloud management device.

BACKGROUND

Today, the drinking water is transported to the home after a series of processing procedures. During the long transportation process, water resources are easily polluted by the external environment or by the pollution source penetration due to the old and damaged underground pipeline, thereby affecting the water delivered at home.

With the continuous development of science and technology, various chemical pollution issues have occurred, and water quality has been affected by pesticides, dioxin, heavy metals and detergents, and therefore the hidden dangers of modern human health increase. These "environmental hormones" are scattered in the environment, return to the human body through the food chain, and deeply affect the physiological regulation function of the human body.

In order to enable families to have truly clean drinking water, the most effective filtration method known at present is to use RO water filter as a water filtration base to filter bacteria, viruses, chemical pollutants and heavy metals, so that the family can have purity and clean water. Combined with activated carbon to remove residual chlorine in the water and the mineralized ball, the drinking water can also contain trace minerals required by the human body.

However, the conventional water filter has the disadvantages, such as the water quality at the terminal is unknown for the user, the use status of the filter element is unknown, whether the water filter is in good condition or not is unknown, whether there is electric leakage or water leakage is unknown. As a result, the user must notify the dealer's maintenance personnel when there is a problem with the water filter.

Therefore, how to provide a system in which a user can know the water quality at the terminal, the use status of the filter element, the status of the water filter, and the dealer can send the maintenance personnel to solve problem at the first time when the problem occurs is the main focus of the present invention.

SUMMARY

One object of the present invention is to provide an Internet of Things water purification system for the user to know the water quality at the water inlet and the terminal, the use status of the filter element, and the state of the water purification device.

Another object of the present invention is to provide an Internet of Things water purification system in which a dealer can dispatch maintenance personnel to solve problem when problem occurs in a water purification device.

The present invention provides an Internet of Things water purification system, which includes a plurality of water purification devices and a cloud management device. Each of the water purification devices includes at least one filter element, at least one water tank, at least one water quantity sensing circuit, at least one filter element sensing circuit, and a water purification side wireless transmission circuit. The filter element is configured to filter tap water into drinking water. The filter element is replaceable when needed. The water tank is configured to store the drinking water. The water quantity sensing circuit is disposed corresponding to the respective water tank and configured to measure a current storage quantity of the drinking water to generate respective water quantity information. The filter element sensing circuit is disposed corresponding to the respective filter element and configured to measure a water quality of the tap water before and after filtered by the respective filter element to generate water quality information. The water purification side wireless transmission circuit is coupled to the water quantity sensing circuit and the filter element sensing circuit and configured to transmit the water quantity information and the water quality information. The cloud management device includes a cloud wireless transmission circuit and a cloud processing circuit. The cloud wireless transmission circuit is coupled to the water purification side wireless transmission circuit and configured to receive the water quantity information and the water quality information. The cloud processing circuit is coupled to the cloud wireless transmission circuit and configured to receive the water quantity information and the water quality information, determine the storage quantity of the drinking water according to the water quantity information, count the water quality information to generate historical water quantity information, and count a current service life of the filter elements according to the current water quality information and the historical water quantity information.

The IoT water purification system of the present invention can perform a remote management on a plurality of water purification devices through a cloud management device. A user of the client side can use a smart phone to remotely monitor the store water quality of the water purification device and the state of use of the filter element, so as to understand the current state of use of the water purification device. When the water purification device has some problems, a repair instruction can be issued to the dealer. The dealer can know the issue from the cloud management device at the first time and immediately dispatch the maintenance personnel to solve the problem. In addition, in the present invention, the low frequency driving signal can also generate a corresponding oscillating response to the filter element, so that the user's physiological signal can be adjusted by the energy oscillation corresponding to the normal waveform to return to the normal state, and all the above objects are achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
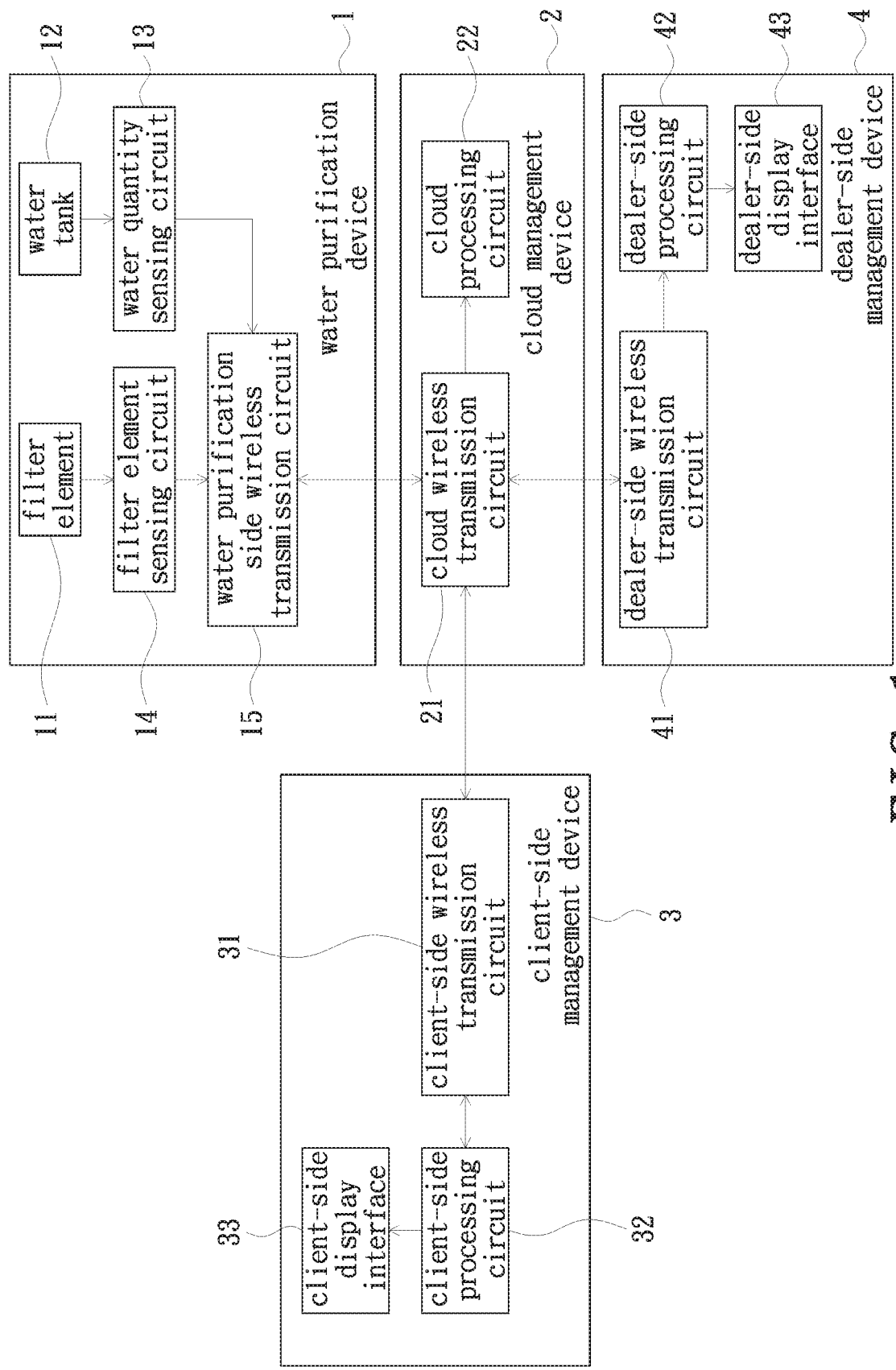
FIG. 1 is a schematic block view of an Internet of Things water purification system according to an embodiment of the present invention.

FIG. 1 is a schematic block view of an Internet of Things (IoT) water purification system according to an embodiment of the present invention. As shown in FIG. 1, the IoT water purification system includes a plurality of water purification devices 1, a cloud management device 2, at least one client-side management device 3, and at least one dealer-side management device 4. The water purification device 1 includes at least one filter element 11, at least one water tank 12, at least one water quantity sensing circuit 13, a filter element sensing circuit 14, and a water purification side wireless transmission circuit 15. The filter element 11 is configured to filter tap water into drinking water. The filter element 11 is replaceable when needed. The water tank 12 is configured to store the drinking water. The water quantity sensing circuit 13 is correspondingly disposed in each water tank 12 and is configured to measure the current storage quantity of the drinking water to generate water quantity information. The filter element sensing circuit 14 is disposed in each filter element 11 and is configured to measure the water quality of the tap water before and after filtered by the filter element 11 to generate water quality information. The water purification side wireless transmission circuit 15 is coupled to the water quantity sensing circuit 13 and the filter element sensing circuit 14 and is configured to transmit the water quantity information and the water quality information.

The cloud management device 2 includes a cloud wireless transmission circuit 21 and a cloud processing circuit 22. The cloud wireless transmission circuit 21 is coupled to the water purification side wireless transmission circuit 15 and is configured to receive the water quantity information and the water quality information. The cloud processing circuit 22 is coupled to the cloud wireless transmission circuit 21 and is configured to receive the water quantity information and the water quality information, determine the storage quantity of the drinking water according to the water quantity information, and determine the current service life of the filter element 11 according to the water quality information.

The difference in the water discharges of the water purification device 1 also affects the service life of the filter element 11. Therefore, the cloud processing circuit 22 in this embodiment further performs historical counting on the water quantity information. The history counting is used to continuously accumulate the water quantity information, and the cloud processing circuit 22 generates historical water quantity information according to the counting result. For example, if each specific time interval is defined as one hour, then the quantity of filtered water within one hour is recorded and the quantity of the filtered water is continuously accumulated over time to generate the historical water quantity information. Then, based on the current water quality information and the historical water quantity information, the current service life of the filter element 11 is calculated to improve the accuracy of determining the service life of the filter element 11.

In addition, the difference in the water quality of the water purification device 1 also affects the service life of the filter element 11. Therefore, the cloud processing circuit 22 in this embodiment further performs historical counting on the water quality information. The history counting is used to continuously accumulate the water quality information, and the cloud processing circuit 22 generates historical water quality information according to the counting result. For example, if each specific time interval is defined as one hour, then the water quality information within one hour is recorded and averaged to obtain average water quality information for the specific time interval, and the average water quality information is continuously accumulated over time to generate the historical water quality information. Then, based on the current water quality information, the historical water quality information, and the historical water quantity information, the current service life of the filter element 11 is calculated to improve the accuracy of determining the service life of the filter element 11.

Further, in order to more accurately determine the service life of the filter element 11 in different historical water quantities, a predetermined value of the historical water quantity may be preset, for example, the predetermined value may be set as the historical water quantity is 5000 L, and the historical water quantity information may further include the record of the historical water quantity. When the historical water quantity is less than the predetermined value, the cloud processing circuit 22 calculates the current service life of the filter element 11 according to the current water quality information and the historical water quantity information. When the historical water quantity is greater than the predetermined value, the cloud processing circuit 22 calculates the current service life of the filter element 11 according to the current water quality information, the historical water quality information and the historical water quantity. Therefore, different algorithms can be provided corresponding to different historical water quantities to more accurately calculate the service life of the filter element 11.

Figure 2:
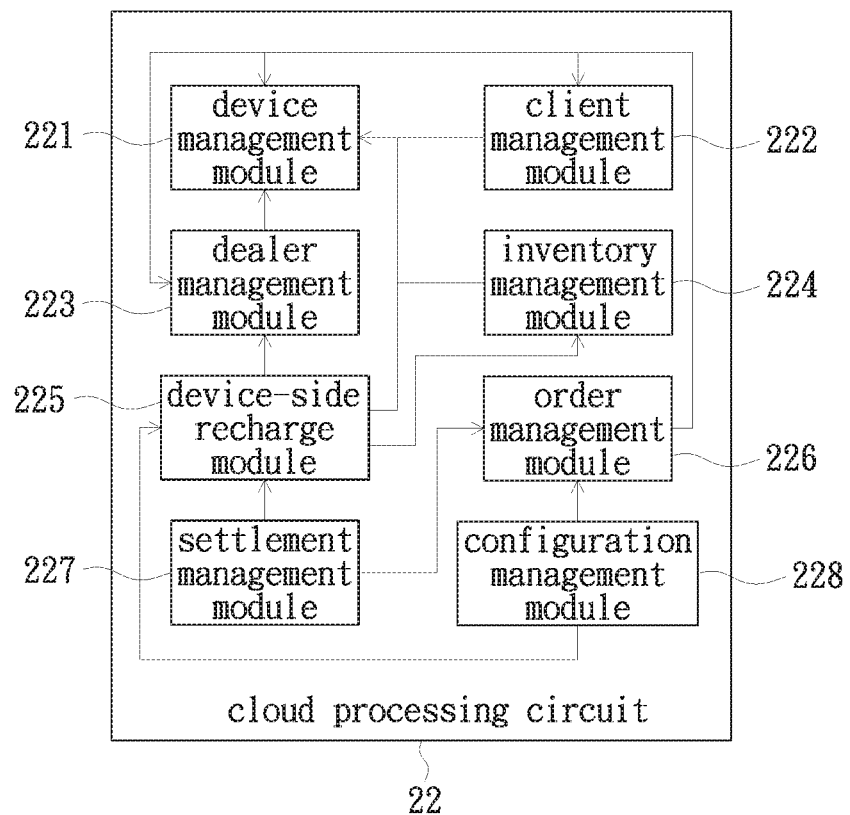
FIG. 2 is a schematic block view of a cloud processing circuit of the Internet of Things water purification system of FIG. 1.

Refer to FIG. 2. The cloud processing circuit 22 includes a device management module 221, a client management module 222, a dealer management module 223, an inventory management module 224, a device-side recharge module 225, an order management module 226, a settlement management module 227, and a configuration management module 228. The device management module 221 is configured to manage the water purification device 1. Each water purification device 1 has a dedicated identification code (ID). The device management module 221 manages the water purification device 1 according to the respective identification code. The client management module 222 is coupled to the device management module 221 and is configured to allow a plurality of client sides to perform identity binding according to the identification code of the respective water purification device 1. The dealer management module 223 is coupled to the device management module 221 and is configured to allow at least one dealer to manage and maintain the water purification device 1. The inventory management module 224 is coupled to the device management module 221, the client management module 222 and the dealer management module 223 and is configured to store the identification code of the water purification device 1 and the information of the corresponding client sides.

The device-side recharge module 225 is coupled to the device management module 221, the client management module 222 and the dealer management module 223 and is configured to allow the client sides to recharge a predetermined number of points. The order management module 226 is coupled to the device management module 221, the client management module 222 and the dealer management module 223 and is configured to receive a replacement instruction for replacing the filter element 11 from the client sides. The settlement management module 227 is coupled to the order management module 226 and the device-side recharge module 225 and is configured to perform a point settle of the corresponding filter element 11 according to the replacement instruction and the number of points of the corresponding client side. The configuration management module 228 is coupled to the order management module 226 and the device-side recharge module 225 and is configured to manage the filter element 11. Each filter element 11 has a dedicated model number, and the configuration management module 228 manages the filter element 11 according to the model number.

Refer to FIG. 1. The client-side management device 3 is exemplified by a smart phone in this embodiment and includes a client-side wireless transmission circuit 31, a client-side processing circuit 32, and a client-side display interface 33. The client-side wireless transmission circuit 31 is coupled to the cloud wireless transmission circuit 21 and is configured to receive the water quantity information and the water quality information. The client-side processing circuit 32 is coupled to the client-side wireless transmission circuit 31 and is configured to generate corresponding store water quantity information and filter element service life information according to the storage quantity of the water purification device 1 and the current service life of the filter element 11 of the client side. The client-side display interface 33 is coupled to the client-side processing circuit 32 and is configured to display the store water quantity information and the filter element service life information. The store water quantity information includes information such as water full, water production, water shortage, raw water quality and water quality.

Figure 3:
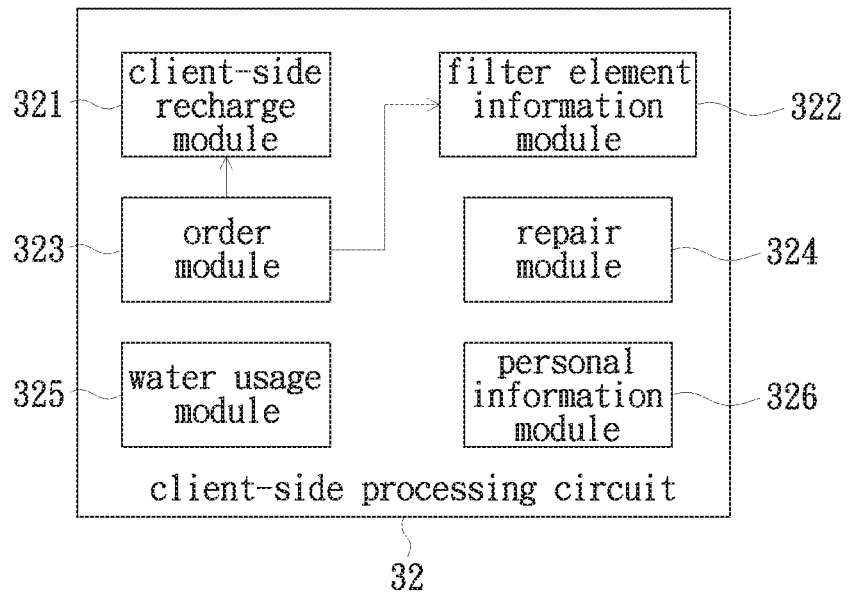
FIG. 3 is a schematic block view of a client-side processing circuit of the Internet of Things water purification system of FIG. 1.
Figure 4:
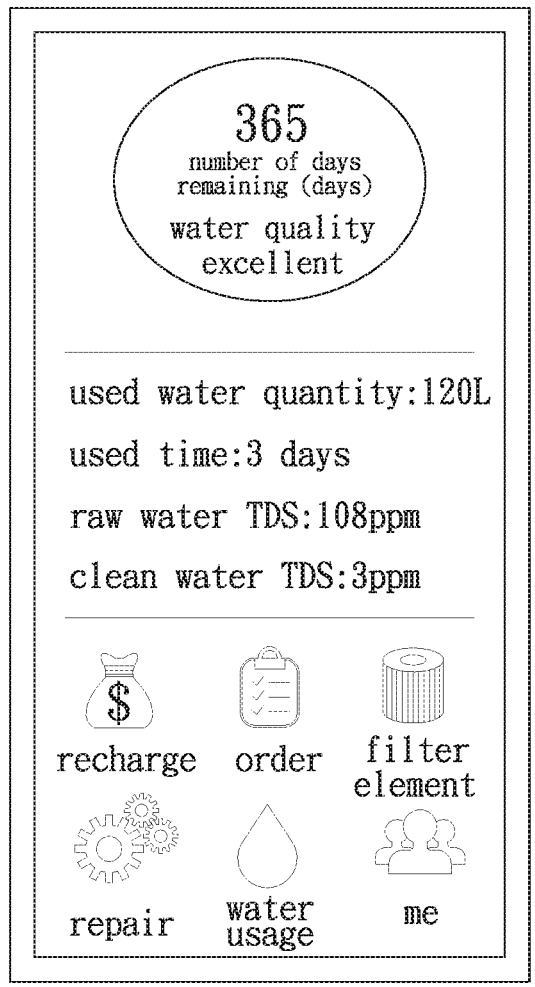
FIG. 4 is a schematic view of a dealer-side processing circuit of the Internet of Things water purification system of FIG. 1.
Figure 5:
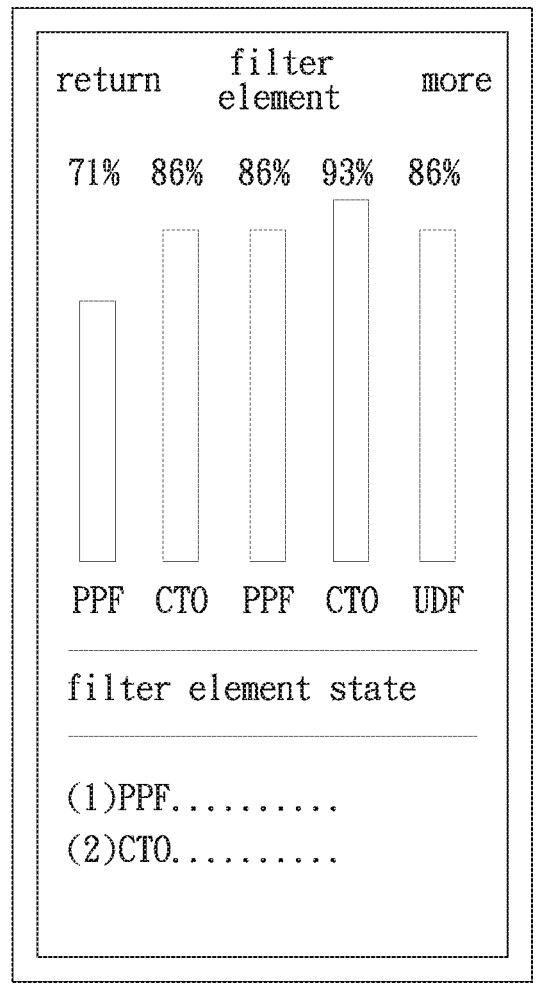
FIG. 5 is a schematic view of a client-side management device of the Internet of Things water purification system of FIG. 1.

Refer to FIGS. 3 and 4. The client-side processing circuit 32 includes a client-side recharge module 321, a filter element information module 322, an order module 323, a repair module 324, a water usage module 325, and a personal information module 326. The client-side recharge module 321 is coupled to the device-side recharge module 225 and is configured to allow the client side to recharge through the client-side recharge module 321. The filter element information module 322 is coupled to the configuration management module 228 and is configured to allow the client side to obtain the filter element service life information and the model number of the filter element 11 (refer to FIG. 5 together) through the filter element information module 322. The order module 323 is coupled to the client-side recharge module 321 and the filter element information module 322 and is configured to generate a recharge order and a filter element order when the client side recharges through the client-side recharge module 321. The repair module 324 is coupled to the device management module 221 and is configured to allow the client side to output a repair instruction to the device management module 221 through the repair module 324 to notify the dealer side to manage and maintain the water purification device 1. The water usage module 325 is configured to allow the client side to signal connect to the cloud processing circuit 22 and obtain the store water quantity information of the corresponding water purification device 1. The personal information module 326 is coupled to the device-side recharge module 225, the configuration management module 228 and the device management module 221 and is configured to allow the client side to obtain the corresponding related information.

Refer to FIG. 1. The dealer-side management device 4 is exemplified by a desktop computer and includes a dealer-side wireless transmission circuit 41, a dealer-side processing circuit 42 and a dealer-side display interface 43. The dealer-side wireless transmission circuit 41 is coupled to the cloud wireless transmission circuit 21 and is configured to receive the water quantity information and the water quality information. The dealer-side processing circuit 42 is coupled to the dealer-side wireless transmission circuit 41 and is configured to generate statistical information according to the storage quantity of the water purification device 1 of the client side and the current service life of the filter element 11. The dealer-side display interface 43 is coupled to the dealer-side processing circuit 42 and is configured to display the statistical information.

Figure 6:
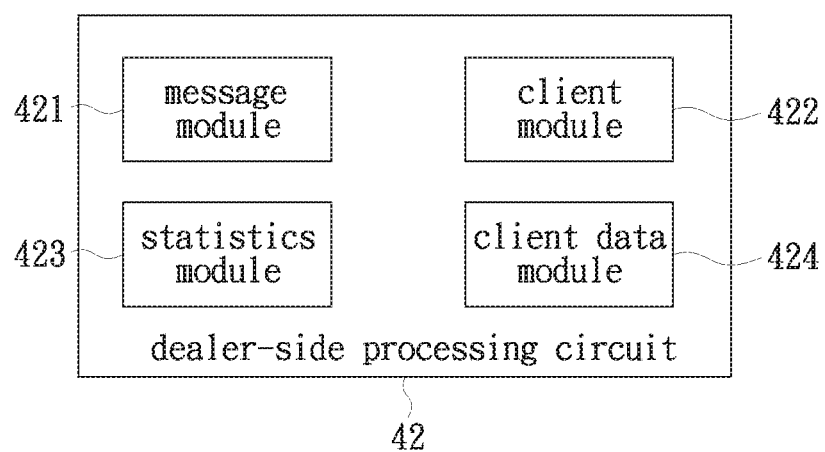
FIG. 6 is a schematic block view of a dealer-side processing circuit of the Internet of Things water purification system of FIG. 1.

Refer to FIG. 6. The dealer-side processing circuit 42 includes a message module 421, a client module 422, a statistics module 423, and a client data module 424. The message module 421 is coupled to the device management module 221 and is configured to allow the dealer side to obtain the identification code and the repair instruction of the water purification device 1 of the client side. The client module 422 is coupled to the device-side recharge module 225, the order management module 226, and the inventory management module 224 and is configured to allow the dealer side to obtain the recharge order and the filter element order. The statistics module 423 is configured to allow the dealer side to signal connect to the cloud processing circuit 22 and obtain the corresponding storage quantity of the water purification device 1 and the current service life of the filter element 11 to generate the corresponding statistical information. The client data module 424 is coupled to the inventory management module 224 and is configured to allow the dealer side to obtain the information of the client sides.

Figure 7:
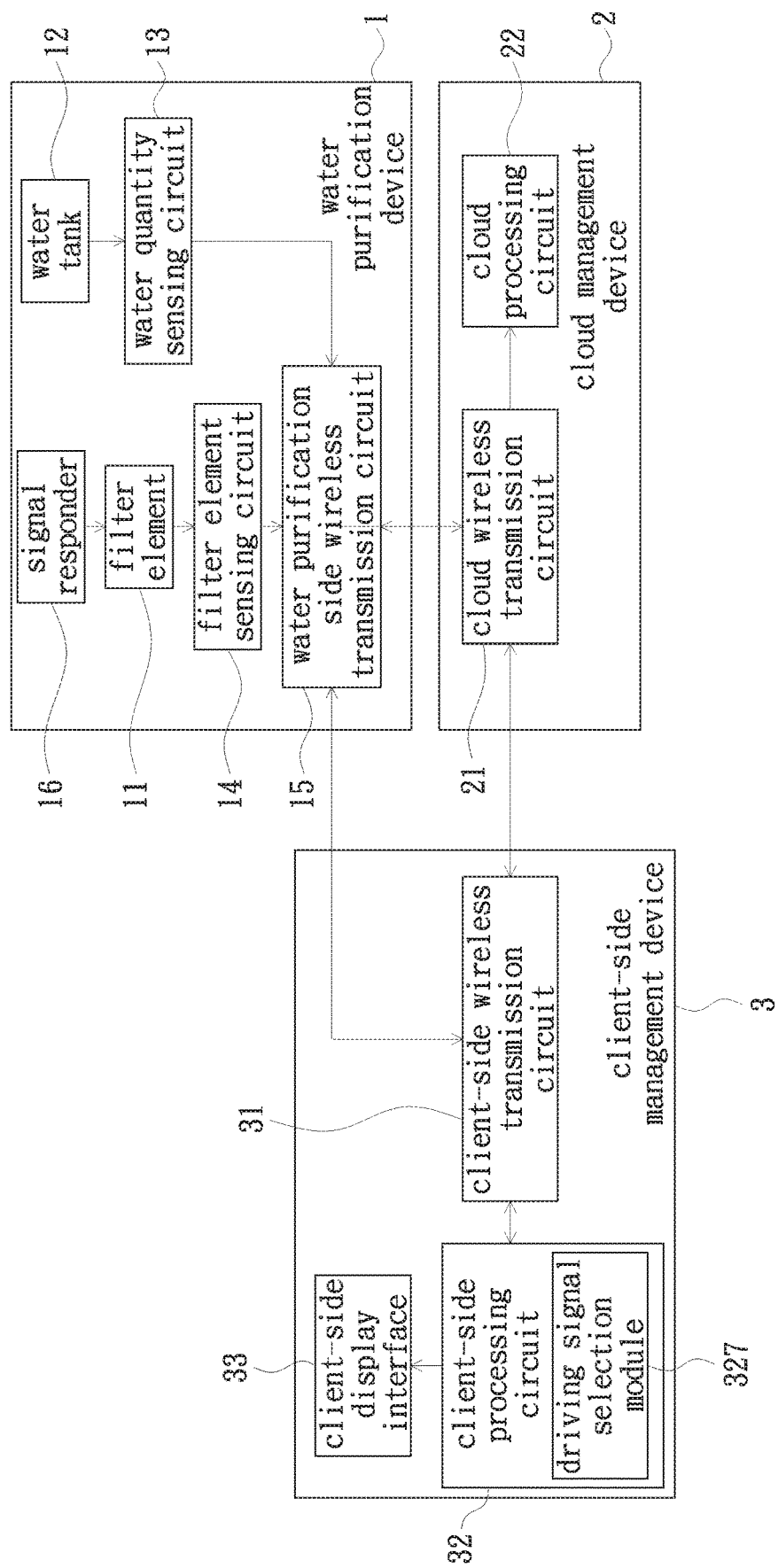
FIG. 7 is a schematic block view of an Internet of Things water purification system according to another embodiment of the present invention.

FIG. 7 is a schematic block view of an IoT water purification system according to another embodiment of the present invention. As shown in FIG. 7, the water purification device 1 further includes a signal responder 16 disposed in and in contact with the filter element 11. The signal responder 16 is configured to generate a corresponding oscillating response according to one of a plurality of low frequency driving signals. The cloud processing circuit 22 further stores the low frequency driving signals. The client-side processing circuit 32 further includes a driving signal selection module 327. The driving signal selection module 327 is configured to allow the client side to signal connect to the cloud wireless transmission circuit 21 and select and download one of the low frequency driving signals stored by the cloud processing circuit 22. The signal responder 16 generates a corresponding oscillating response to the filter element 11 according to the low frequency driving signal selected by the client side.

Figure 8:
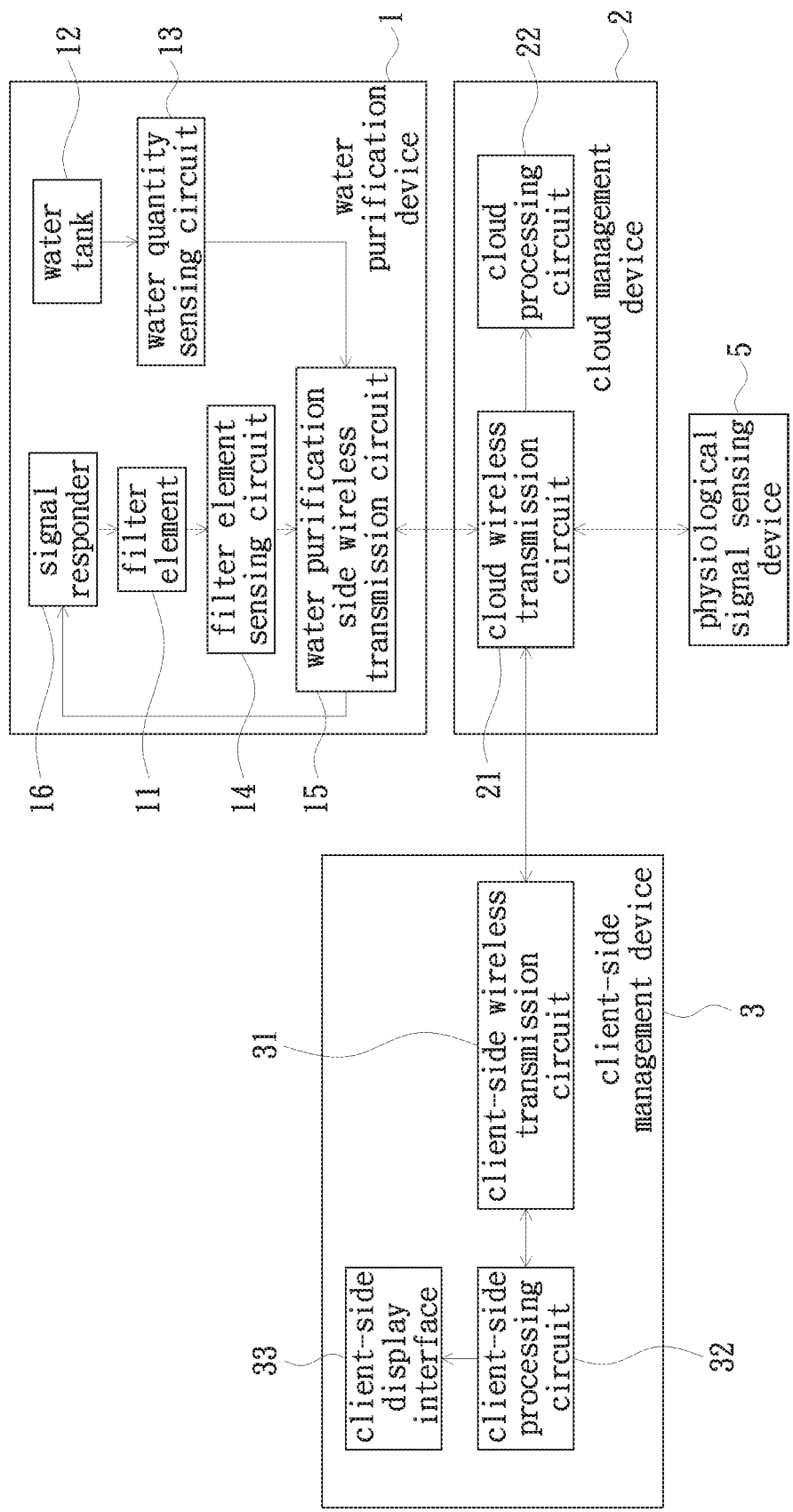
FIG. 8 is a schematic block view of the Internet of Things water purification system according to another embodiment of the present invention shown in FIG. 7 with an additional physiological signal sensing device.

FIG. 8 is a schematic block view of an IoT water purification system according to another embodiment of the present invention. As shown in FIG. 8, the IoT water purification system further include at least one physiological signal sensing device 5. The physiological signal sensing device 5 is coupled to the cloud wireless transmission circuit 21 and is configured to sense a user to generate a physiological measurement signal corresponding to the user. The cloud processing circuit 21 can select and adjust the corresponding low frequency driving signal according to the physiological measurement signal.

In addition, the client-side wireless transmission circuit 31 in this embodiment can be wirelessly coupled to the water purification side wireless transmission circuit 15, for example, through a wireless network (WiFi). As such, the client side can directly control the signal responder 16 to generate a corresponding oscillating response to the filter element 11 via the cloud through the client-side management device 3.

Further, the human body has some natural physiological frequencies, such as pulse rate, heart rate or brain wave frequency, etc. These natural physiological frequencies can be sensed by sensing devices, such as electrocardiogram (ECG), heart rate variability (HRV), photoplethysmography (PPG) or brainwave, etc. According to the sensed frequencies, the human body frequencies corresponding to the specific parts of the body of the user are calculated. Since the performance of the human body can be conditioned by the energy oscillation corresponding to the normal waveform, the physiological signal of the user can return to the normal state after the performance of the human body is conditioned by the energy oscillation. Therefore, the client side can select the low frequency driving signal that is most needed for him/her from the various types low frequency driving signals stored in the cloud processing circuit 22 respectively corresponding to the physiological signals allowing the different parts of body to return to the normal states. The selected low frequency driving signal is then downloaded to the water purification device 1. The signal responder 16 generates a corresponding oscillating response to the filter element 11 according to the selected low frequency driving signal. As such, the oscillating energy can be simultaneously transmitted to the filtered water when the filter element 11 filters the water. The physiological signal of the user can return to the normal state when the client side drinks the oscillating-energy water. In addition, since the energy oscillation required by each person is different, the physiological signal sensing device 5 can further measure a dedicated physiological signal for the cloud processing circuit 21 to select and adjust the frequency and waveform of the low frequency driving signal required for the physiological signals of the user returning to the normal state.

In this embodiment, the signal responder 16 may include an oscillating circuit and may generate a corresponding oscillating frequency to the filter element 11 according to the low frequency driving signal. Or, the signal responder 16 may include an illuminating circuit and may generate a corresponding oscillation pulse light to the filter element 11 according to the low frequency driving signal.

Figure 9:
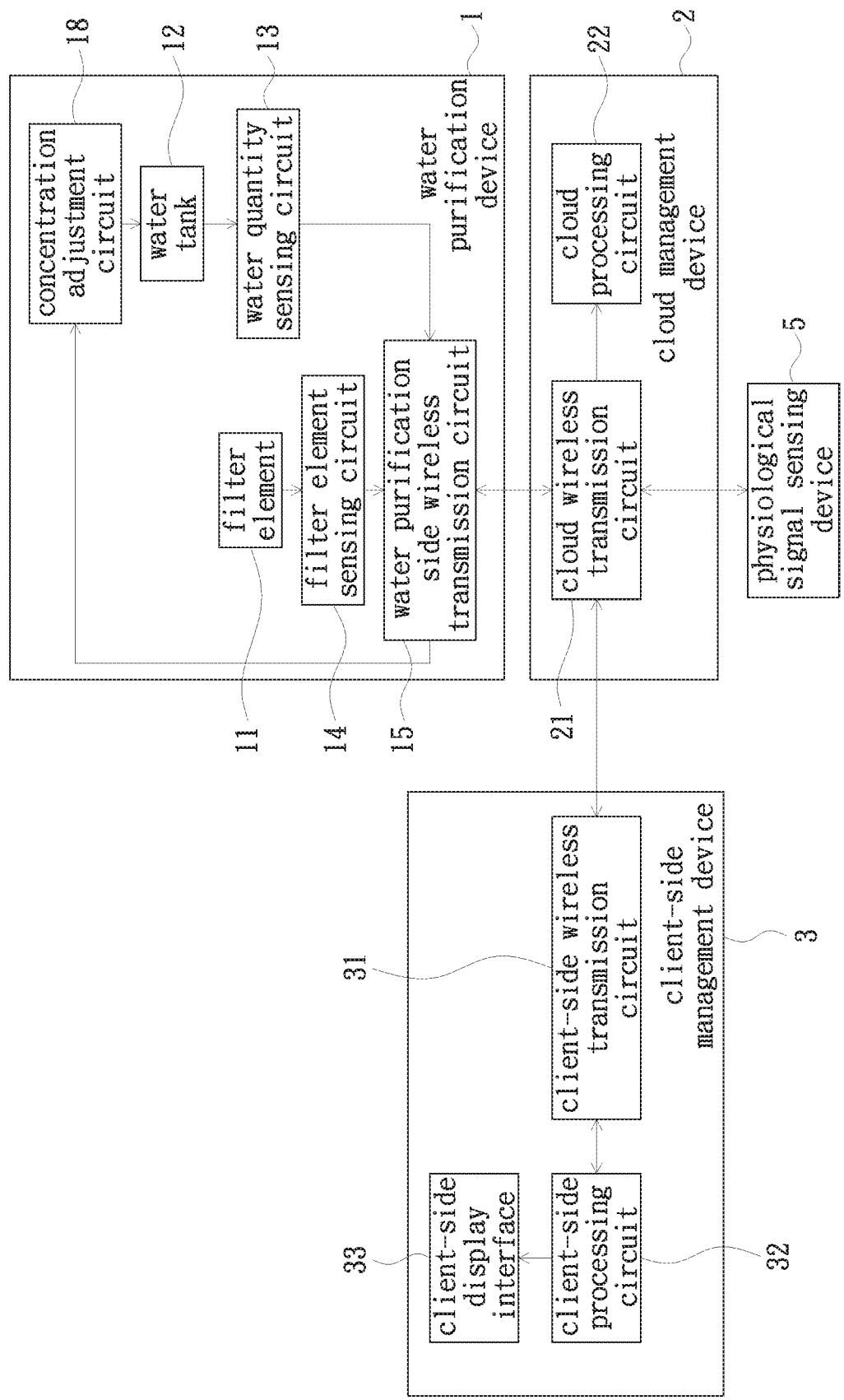
FIG. 9 is a schematic block view of an Internet of Things water purification system according to another embodiment of the present invention, for explaining the controlling of the concentration of drinking water.

FIG. 9 is a schematic block view of an IoT water purification system according to another embodiment of the present invention. As shown in FIG. 9, the water purification device 1 further includes a concentration adjustment circuit 18. The concentration adjustment circuit 18 is disposed in the water tank 12 and is coupled to the water purification side wireless transmission circuit 15. In this embodiment, the physiological signal sensing device 5 first performs physiological measurement on the user to generate a physiological measurement signal, and then the cloud processing circuit 22 controls the concentration adjustment circuit 18 to apply a concentration of a first substance to the filtered drinking water in the water tank 12 according to the physiological measurement signal after obtaining the physiological measurement signal. In this embodiment, the first substance is, for example, helium, but the invention is not limited thereto.

In addition, in this embodiment, the cloud processing circuit 22 may further control the concentration adjustment circuit 18 to apply a combining concentration of a first substance and a second substance to the filtered drinking water in the water tank 12 according to the physiological measurement signal after obtaining the physiological measurement signal. In this embodiment, the first substance is, for example, ruthenium, and the second substance is, for example, potassium, sodium, calcium or magnesium, but the invention is not limited thereto.

The IoT water purification system of the present invention can perform a remote management on a plurality of water purification devices through a cloud management device. A user of the client side can use a smart phone to remotely monitor the store water quality of the water purification device and the state of use of the filter element, so as to understand the current state of use of the water purification device. When the water purification device has some problems, a repair instruction can be issued to the dealer. The dealer can know the issue from the cloud management device at the first time and immediately dispatch the maintenance personnel to solve the problem. In addition, in the present invention, the low frequency driving signal can also generate a corresponding oscillating response to the filter element, so that the user's physiological signal can be adjusted by the energy oscillation corresponding to the normal waveform to return to the normal state, and all the above objects are achieved.

The above-mentioned statements are merely preferred embodiments of the present invention, and not intended to limit in any form; although the present invention has been disclosed in the above-mentioned preferred embodiments, being not intended to limit the present invention; any technical person skilled in the art, without departing from the technical scope of the present invention, can make some modifications or revisions to the equivalent embodiments by using above-mentioned methods and technical contents; whatever is without departing from the technical scope of the present invention, depending on the technical spirit of the present invention to make any simple modifications, equivalent changes, and revisions are still within the scope of the present invention.

What is claimed is:

1. An Internet of Things water purification system, comprising: at least one water purification device, comprising:
   at least one filter element, configured to filter tap water into filtered drinkable water, wherein the at least one filter element is replaceable when needed;
   at least one water tank, configured to store the filtered drinkable water;

at least one water volume sensing circuit, wherein the at least one water volume sensing circuit is disposed in a corresponding water tank and measures an accumulated consumption of the filtered drinkable water to generate information of water volume which represents the accumulated consumption;

at least one water quality measuring circuit, wherein the at least one water quality measuring circuit is disposed in a corresponding filter element and measures water quality of the tap water before it is filtered by the corresponding filter element and water quality of the filtered drinkable water after being filtered by the corresponding filter element to generate information of water quality;

a wireless transmission circuit, coupled to the at least one water volume sensing circuit and the sensing water quality measuring circuit, configured to transmit the information of the water volume and of the water quality; and a cloud management device, coupled to the water purification device, comprising: a cloud wireless transmission circuit, coupled to the wireless transmission circuit of the at least one water purification device, and configured to receive the information of the water volume information and of the water quality; and a cloud processing circuit, coupled to the cloud wireless transmission circuit, and configured to receive the information of the water volume and of the water quality, determine the storage quantity of the drinking water according to the water quantity information, determine the accumulated consumption of the filtered drinkable water, generate information of an accumulated water volume, and calculate a current service life of the at least one filter element according to information of a current water quality and of a historical water volume.

2. The Internet of Things water purification system according to claim 1, wherein the cloud processing circuit comprises:

a device management module, configured to manage the water purification device, wherein the at least one water purification device comprises a dedicated identification code, and the device management module manages the at least one water purification device according to the respective identification code;

a client management module, coupled to the device management module, configured to bind the identification code of the at least one water purification device with a client;

a dealer management module, coupled to the device management module, configured to allow more than one dealers to manage and maintain the at least one water purification device to clean, repair or replace the at least one filter element or other elements of the at least one water purification device, and add water treatment chemicals or other materials; and an inventory management module, coupled to the device management module, the client management module and the dealer management module, configured to store stock information.

3. The Internet of Things water purification system according to claim 2, wherein the cloud processing circuit further comprises:

a device deposit module, coupled to the device management module, the client management module and the dealer management module, configured to allow the client to make a deposit for a corresponding water purification device usage;

an order management module, coupled to the device management module, the client management module and the dealer management module, configured to allow the client to order replacement filter elements;

a settlement management module, coupled to the order management module and the device deposit module, configured to allow the client to calculate a cash or points balance; and a configuration management module, coupled to the order management module and the device deposit module, configured to manage whether the at least one filter element is replaced, wherein each of the at least one filter element has a dedicated model number, and the configuration management module manages the at least one filter element according to the respective model number.

4. The Internet of Things water purification system according to claim 3, further comprising a client management device, wherein the client management device comprises:

a client wireless transmission circuit, coupled to the cloud wireless transmission circuit, configured to receive the information of the water volume and of the water quality;

a client processing circuit, coupled to the client-side wireless transmission circuit, configured to generate the information of the accumulated water volume and of the current service life of the at least one filter element; and a client display interface, coupled to the client processing circuit, configured to display the information of the accumulated water volume and of the current service life of the at least one filter element.

5. The Internet of Things water purification system according to claim 4, wherein the client-side processing circuit comprises:

a client deposit module, coupled to the device deposit module, configured to allow the client to make a deposit through the client deposit module;

a filter element information module, coupled to the configuration management module, configured to allow the client to obtain the information of the current service life of the at least one filter element and the model number of the at least one filter element through the filter element information module;

an order module, coupled to the client deposit module and the filter element information module, configured to generate a deposit order and a filter element order when the client makes a deposit through the client deposit module;

a repair module, coupled to the device management module, configured to allow the client to transmit a replacement order to the device management module through the repair module to notify the dealer to manage and maintain the at least one water purification device;

a water usage module, configured to allow the client to connect to the cloud processing circuit and obtain the information of the accumulated water volume of the at least one water purification device through the client wireless transmission circuit; and a personal information module, coupled to the device deposit module, the configuration management module and the device management module, configured to allow the client to obtain corresponding related information through the client wireless transmission circuit, wherein the corresponding related information include the cash or points balance, the model number of the at least one filter element, and the identification code of the water purification device.

6. The Internet of Things water purification system according to claim 5, further comprising a dealer management device, wherein the dealer management device comprises:
  a dealer-wireless transmission circuit, coupled to the cloud wireless transmission circuit, configured to receive the information of water volume and of water quality;
  a dealer-side processing circuit, coupled to the dealer-side wireless transmission circuit, configured to generate statistical information according to the information of the accumulated water volume and of the current service life of the at least one filter element; and
  a dealer display interface, coupled to the dealer processing circuit, configured to display the statistical information.

7. The Internet of Things water purification system according to claim 6, wherein the dealer processing circuit comprises:
  a message module, coupled to the device management module, configured to allow the dealer side to obtain the identification code and the replacement order of the at least one water purification device of the client;
  a client module, coupled to the device deposit module, the order management module and the inventory management module, configured to allow the dealer to obtain the payment and the replacement order of the at least one filter element;
  a statistics module, configured to allow the dealer to connect to the cloud processing circuit and obtain the information of the accumulated water volume and of the current service life of the at least one filter element to generate the corresponding statistical information; and
  a client data module, coupled to the inventory management module, configured to allow the dealer to obtain the information of the client, wherein the information of the client includes the model number of the at least one filter element, and the identification code of the at least one water purification device.

8. The Internet of Things water purification system according to claim 4, wherein the water purification device further comprises a frequency signal responder disposed in and in contact with the at least one filter element and configured to generate a corresponding oscillating response according to one of a plurality of low frequency driving signals, wherein the cloud processing circuit further stores the low frequency driving signals, wherein the client processing circuit further comprises a driving signal selection module configured to allow the client to connect to the cloud wireless transmission circuit and select and download one of the low frequency driving signals, wherein the frequency signal responder generates the corresponding oscillating response to the at least one filter element according to the low frequency driving signal selected by the client, and wherein the Internet of Things water purification system further comprises at least one physiological signal sensing device coupled to the cloud wireless transmission circuit and configured to sense a user to generate a physiological measurement signal corresponding to the user, so that the cloud processing circuit selects and adjusts a frequency of the corresponding low frequency driving signal according to the physiological measurement signal.

9. The Internet of Things water purification system according to claim 8, wherein the client wireless transmission circuit is wirelessly coupled to the wireless transmission circuit of the at least one water purification device, and the client management device allows the client to remotely drive the frequency signal responder.

10. The Internet of Things water purification system according to claim 8, wherein the frequency signal responder comprises an oscillating circuit configured to generate a corresponding oscillating frequency according to the low frequency driving signal.

11. The Internet of Things water purification system according to claim 8, wherein the frequency signal responder comprises an illuminating circuit configured to generate a corresponding oscillation pulse light according to the low frequency driving signal.

12. The Internet of Things water purification system according to claim 1, wherein the cloud processing circuit generates the information of the historical water volume and calculates the current service life of the at least one filter element according to the information of the current water quality, of a historical water quality, and of the historical water volume.

13. The Internet of Things water purification system according to claim 12, wherein the information of the historical water volume comprises a historical water consumption, wherein when the historical water consumption is less than a predetermined value, the cloud processing circuit calculates the current service life of the at least one filter element according to the information of the current water quality and of the historical water volume, wherein when the historical water consumption is greater than the predetermined value, the cloud processing circuit calculates the current service life of the at least one filter element according to the information of the current water quality, of the historical water quality and of the historical water volume.

14. The Internet of Things water purification system according to claim 1, further comprising at least one physiological signal sensing device coupled to the cloud wireless transmission circuit and configured to sense a user to generate a physiological measurement signal corresponding to the user, wherein each of the at least one water purification devices further comprises a concentration adjustment circuit disposed in the at least one water tank and coupled to the wireless transmission circuit of the at least one water purification device, and the cloud processing circuit controls the concentration adjustment circuit to apply a first substance having a first concentration to the filtered drinkable water in the water tank according to the physiological measurement signal.

15. The Internet of Things water purification system according to claim 1, further comprising at least one physiological signal sensing device coupled to the cloud wireless transmission circuit and configured to sense a user to generate a physiological measurement signal corresponding to the user, wherein each of the at least one water purification devices further comprises a concentration adjustment circuit disposed in the at least one water tank and coupled to the wireless transmission circuit of the at least one water purification device, and the cloud processing circuit controls the concentration adjustment circuit to apply a combination of a first substance having a first concentration and a second substance having a second concentration to the filtered drinkable water in the at least one water tank according to the physiological measurement signal.

16. The Internet of Things water purification system according to claim 1, wherein the water volume sensing circuit is a water flow meter, and the water quality measuring circuit is a total dissolved solids (TDS) detecting device.

\* \* \* \* \*